United States Patent
Fu et al.

(10) Patent No.: US 12,265,839 B2
(45) Date of Patent: Apr. 1, 2025

(54) MANAGEMENT METHOD AND APPARATUS FOR TRANSACTION PROCESSING SYSTEM, DEVICE, AND MEDIUM

(71) Applicant: Huawei Cloud Computing Technologies Co., Ltd., Guizhou (CN)

(72) Inventors: Xudong Fu, Chengdu (CN); Chengwei Zhang, Gui'an (CN); Feiteng Huang, Chengdu (CN); Bo Ren, Chengdu (CN); Kexu Lin, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 283 days.

(21) Appl. No.: 17/946,628

(22) Filed: Sep. 16, 2022

(65) Prior Publication Data

US 2023/0014340 A1    Jan. 19, 2023

Related U.S. Application Data

(63) Continuation of application No. PCT/CN2021/081667, filed on Mar. 19, 2021.

(30) Foreign Application Priority Data

Mar. 19, 2020 (CN) .................. 202010197554.0
Apr. 28, 2020 (CN) .................. 202010348859.7

(51) Int. Cl.
*G06F 16/00* (2019.01)
*G06F 9/46* (2006.01)
(Continued)

(52) U.S. Cl.
CPC ............ *G06F 9/466* (2013.01); *G06F 16/185* (2019.01); *G06F 16/27* (2019.01)

(58) Field of Classification Search
CPC ........ G06F 16/185; G06F 9/466; G06F 16/27; G06F 16/23
See application file for complete search history.

(56) References Cited

U.S. PATENT DOCUMENTS 6,879,324 B1 *   4/2005   Hoppe .................. G06T 17/205
                                                  345/428
2012/0303791 A1 *  11/2012  Calder .................. G06F 9/5083
                                                  709/224

(Continued)

FOREIGN PATENT DOCUMENTS

CN    103365923 A    10/2013
CN    106294757 A    1/2017
CN    108984308 A    12/2018

*Primary Examiner* — Yicun Wu
(74) *Attorney, Agent, or Firm* — Conley Rose, P.C.

(57) ABSTRACT

A management method is implemented by a transaction processing system. The transaction processing system includes a plurality of participant nodes. Each participant node stores a data partition and is configured to process a plurality of transactions. A combination of data partitions accessed by each transaction includes at least one data partition. The management method includes obtaining a quantity of transactions accessing each combination of data partitions in a cycle and adjusting storage of the data partitions on the plurality of participant nodes based on the quantity of transactions accessing each combination of data partitions in the cycle.

20 Claims, 7 Drawing Sheets

(51) Int. Cl.
  *G06F 16/185* (2019.01)
  *G06F 16/27* (2019.01)

(56) References Cited

U.S. PATENT DOCUMENTS

| | | | |
|---|---|---|---|
| 2014/0114910 A1* | 4/2014 | Cao | G06F 16/278 |
| | | | 707/607 |
| 2014/0122510 A1 | 5/2014 | Namkoong et al. | |
| 2016/0350392 A1 | 12/2016 | Rice et al. | |
| 2019/0258904 A1* | 8/2019 | Ma | G06F 18/24133 |
| 2021/0072917 A1* | 3/2021 | Surla | G06F 3/0647 |

\* cited by examiner

MANAGEMENT METHOD AND APPARATUS FOR TRANSACTION PROCESSING SYSTEM, DEVICE, AND MEDIUM

CROSS-REFERENCE TO RELATED APPLICATIONS

This is a continuation of International Patent Application No. PCT/CN2021/081667 filed on Mar. 19, 2021, which claims priority to Chinese Patent Application No. 202010348859.7 filed on Apr. 28, 2020, and Chinese Patent Application No. 202010197554.0 filed on Mar. 19, 2020. All of the aforementioned applications are hereby incorporated by reference in their entireties.

TECHNICAL FIELD

This disclosure relates to the field of computer technologies, and in particular, to a management method and apparatus for a transaction processing system, a device, and a computer-readable storage medium.

BACKGROUND

A transaction is a logical unit in an execution process of a database management system, including a limited database operation sequence. In a distributed system, when a transaction is executed across a plurality of participants, each participant can determine an execution result of the transaction executed by the participant, but cannot learn of an execution result of another participant. For a purpose of maintaining atomicity, consistency, isolation, and durability of the transaction, a coordinator needs to be introduced to manage the participant that executes the transaction.

Two-phase commit (2PC) is a method designed for transaction commit based on a system architecture of the distributed system. However, in this method, the coordinator and the participant need to interact a plurality of times. Consequently, a transaction commit delay is long, and transaction commit performance deteriorates.

SUMMARY

Embodiments of this disclosure provide a management method for a transaction processing system, to resolve a problem in related technologies that a transaction commit delay is long and transaction commit performance deteriorates because a coordinator and a participant need to interact a plurality of times. Embodiments of this disclosure further provide an apparatus, a device, a computer-readable storage medium, and a computer program product corresponding to the foregoing method.

According to a first aspect, this disclosure provides a management method for a transaction processing system. The transaction processing system includes a plurality of participant nodes, each participant node stores a data partition, each participant node is configured to process a plurality of transactions, and a combination of data partitions accessed by each transaction includes at least one data partition. The transaction processing system further includes a coordinator node. The management method for the transaction processing system may be performed by the coordinator node. In some implementations, the transaction processing system may further include a router node, configured to implement read/write splitting. Based on this, the management method for the transaction processing system may alternatively be performed by the router node. In some implementations, the management method for the transaction processing system may alternatively be performed by a node outside the transaction processing system. In embodiments of this disclosure, a node that performs the management method for the transaction processing system is referred to as a management node.

The management node obtains a quantity of transactions accessing each combination of data partitions in a cycle. Each combination of data partitions may be a combination of all data partitions stored in the transaction processing system, or may be a combination of some data partitions stored in the transaction processing system. Then, the management node adjusts storage of the data partitions on the plurality of participant nodes based on the quantity of transactions accessing each combination of data partitions in the cycle, to reduce a quantity of participant nodes participating in the transaction. In this way, a quantity of times of interaction between the coordinator node and the participant node can be reduced, a transaction commit delay can be shortened, and transaction commit performance can be improved.

In some implementations, the management node may collect, in the cycle, the quantity of transactions accessing each combination of data partitions. In this way, the management node may adjust storage of the data partitions on the plurality of participant nodes based on the quantity of transactions obtained in real time. Because the quantity of transactions collected in real time is accurate, data partitions that are accessed at a high probability together may be adjusted to one participant node, so that adjustment precision is high.

In some implementations, the management node may obtain a quantity of transactions accessing each combination of data partitions in a history cycle, and predict, based on the quantity of transactions accessing each combination of data partitions in the history cycle, the quantity of transactions accessing each combination of data partitions in the cycle. In this way, when adjusting storage of the data partition on the participant node, the management node may adjust in advance based on a prediction result, so that a transaction commit delay can be shortened in the cycle, and transaction commit performance is improved.

In some implementations, the management node may predict, based on the quantity of transactions accessing each combination of data partitions in the history cycle and any one of an autoregressive integrated moving average model, an exponential smoothing model, a non-parametric time series model, a prophet model, and a deep learning-based time series model, the quantity of transactions accessing the at least one combination of data partitions in the cycle.

According to different service scenarios, the management node may use different models to predict the quantity of transactions accessing each combination of data partitions in the cycle. For example, for service scenarios such as a service scenario of sales revenue prediction, a service scenario of traffic flow prediction, and a service scenario of hospital patient quantity prediction, the management node may perform prediction based on the autoregressive integrated moving average model (ARIMA). For another example, for service scenarios such as a service scenario of stock fluctuation prediction and a service scenario of factory production prediction, the management node may predict, based on the exponential smoothing model, the quantity of transactions accessing each combination of data partitions in the cycle. Certainly, for the service scenario of sales revenue prediction, the management node may also perform prediction based on the exponential smoothing model.

For service scenarios such as the service scenario of sales revenue prediction and a service scenario of intermittent prediction for product sales, the management node may further predict, based on the non-parametric time series (NPTS) model and the quantity of transactions accessing each combination of data partitions in the history cycle, the quantity of transactions accessing each combination of data partitions in the cycle. It should be noted that, the management node may further predict, based on an NPTS-related variant model, the quantity of transactions accessing each combination of data partitions in the cycle.

For service scenarios such as a service scenario of climate prediction, a service scenario of holiday traffic prediction, and a service scenario of transaction data prediction, the management node may further perform prediction based on the prophet model. For climate prediction, store visit count prediction, commodity promotion prediction, and sales revenue prediction, the management node may further use the deep learning-based time series model (deep augmented reality (AR)).

In some implementations, the management node may determine a target combination of data partitions based on the quantity of transactions accessing the combination of data partitions in the cycle, and migrate one or more data partitions in the target combination of data partitions from N participant nodes to M participant nodes, where N is greater than M.

The target combination of data partitions may be one or more of the accessed combinations of data partitions in the cycle. When a quantity of transactions accessing a combination of data partitions in the cycle reaches a preset quantity, the management node may determine the combination of data partitions as the target combination of data partitions. In some implementations, the management node may further determine a ratio of the quantity of transactions accessing the combination of data partitions in the cycle to a total quantity of transactions accessing each combination of data partitions, and when the ratio is greater than a preset ratio, determine the combination of data partitions as the target combination of data partitions.

The target combination of data partitions may alternatively be one or more of sub-combinations of the accessed combinations of data partitions in the cycle. When a quantity of transactions accessing a sub-combination in the cycle reaches a preset quantity, the management node may determine the sub-combination as the target combination of data partitions. In some implementations, the management node may further determine a ratio of the quantity of transactions accessing the sub-combination in the cycle to a total quantity of transactions accessing each combination of data partitions, and when the ratio is greater than a preset ratio, determine the combination of data partitions as the target combination of data partitions.

In some implementations, in consideration of a case in which performance deteriorates when a node is overloaded, the management node may adjust storage of the data partitions on the plurality of participant nodes based on the quantity of transactions accessing each combination of data partitions in the cycle, and load of the participant nodes.

The management node may obtain load of each participant node, and then migrate each data partition in the target combination of data partitions from the N participant nodes to M light-load participant nodes. To reduce overheads generated by the migration operation, the management node may migrate each data partition in the target combination of data partitions from the N participant nodes to M light-load participant nodes among the N nodes.

According to a second aspect, this disclosure provides a management apparatus for a transaction processing system. The transaction processing system includes a plurality of participant nodes, each participant node stores a data partition, each participant node is configured to process a plurality of transactions, and a combination of data partitions accessed by each transaction includes at least one data partition. The apparatus includes: a communications module, configured to obtain a quantity of transactions accessing each combination of data partitions in a cycle; and a management module, configured to adjust storage of the data partitions on the plurality of participant nodes based on the quantity of transactions accessing each combination of data partitions in the cycle.

In some implementations, the apparatus further includes: a collection module, configured to collect, in the cycle, the quantity of transactions accessing each combination of data partitions.

In some implementations, the communications module is configured to: obtain a quantity of transactions accessing each combination of data partitions in a history cycle.

The apparatus further includes: a prediction module, configured to predict, based on the quantity of transactions accessing each combination of data partitions in the history cycle, the quantity of transactions accessing each combination of data partitions in the cycle.

In some implementations, the management module is configured to: determine a target combination of data partitions based on the quantity of transactions accessing each combination of data partitions in the cycle; and migrate one or more data partitions in the target combination of data partitions from N participant nodes to M participant nodes, where N is greater than M.

In some implementations, the management module is configured to: adjust storage of the data partitions on the plurality of participant nodes based on the quantity of transactions accessing each combination of data partitions in the cycle and load of the participant nodes.

According to a third aspect, this disclosure provides a device. The device includes a processor and a memory. The processor and the memory communicate with each other. The processor is configured to execute instructions stored in the memory, to enable the device to perform the management method for the transaction processing system according to any one of the first aspect or the implementations of the first aspect.

According to a fourth aspect, this disclosure provides a computer-readable storage medium. The computer-readable storage medium stores instructions. When the instructions are run on a device, the device is enabled to perform the management method for the transaction processing system according to any one of the first aspect or the implementations of the first aspect.

According to a fifth aspect, this disclosure provides a computer program product including instructions. When the computer program product runs on a device, the device is enabled to perform the management method for the transaction processing system according to any one of the first aspect or the implementations of the first aspect.

In this disclosure, based on the implementations according to the foregoing aspects, the implementations may be further combined to provide more implementations.

BRIEF DESCRIPTION OF DRAWINGS

To describe the technical methods in embodiments of this disclosure more clearly, the following briefly describes the accompanying drawings for the embodiments.

DESCRIPTION OF EMBODIMENTS

Figure 1:
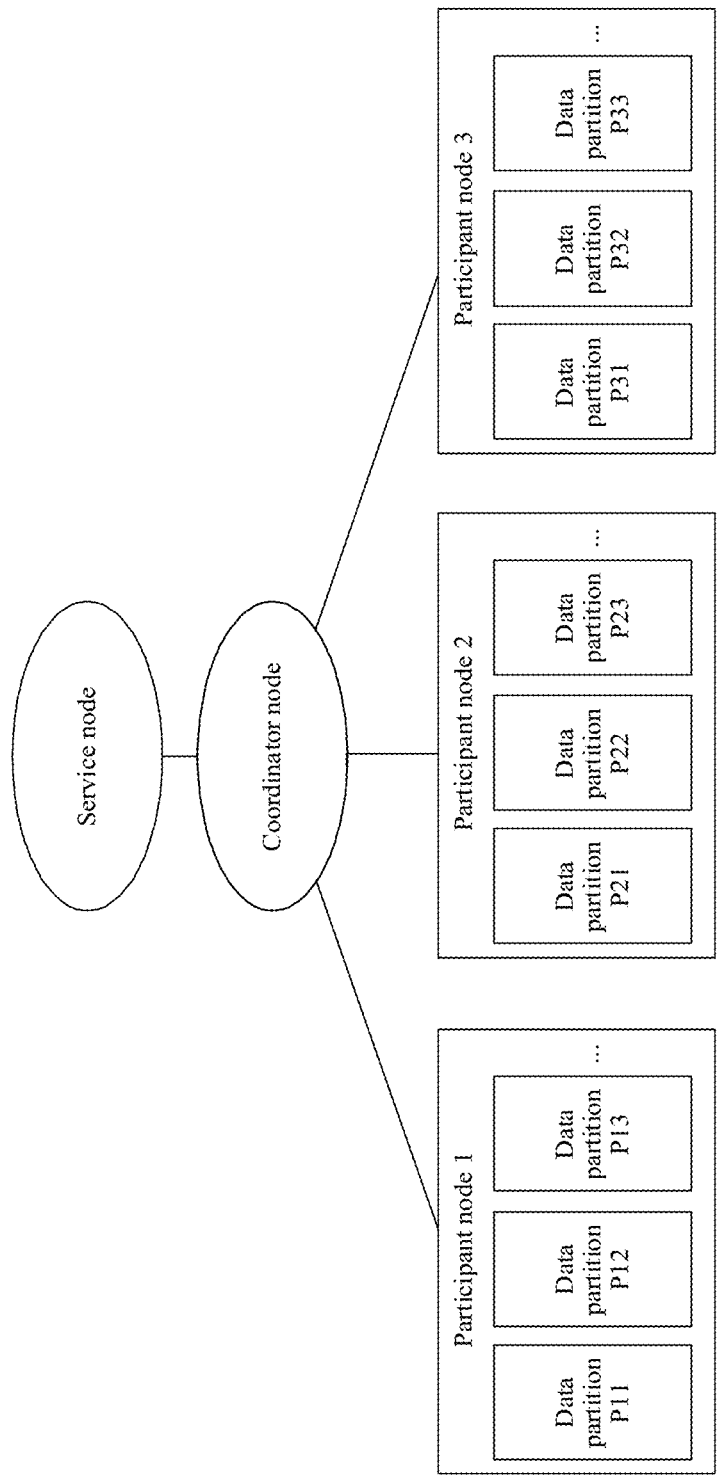
FIG. 1 is a diagram of a system architecture of a distributed system according to an embodiment of this disclosure.

Terms "first" and "second" in embodiments of this disclosure are merely intended for description, and shall not be understood as an indication or implication of relative importance or implicit indication of a quantity of indicated technical features. Therefore, a feature limited by "first" or "second" may explicitly or implicitly include one or more features.

The following first describes some related concepts in embodiments of this disclosure.

A transaction is a logical unit in an execution process of a database management system, including a limited database operation sequence. To ensure correctness and reliability of data, the transaction is supposed to have four features: atomicity, consistency, isolation, and durability.

The atomicity means that all or none of operations in a transaction are completed, and do not end in an intermediate phase. If an error occurs in an execution process of the transaction, the transaction is rolled back to a state before the transaction starts. The consistency means that database integrity is not damaged before a transaction starts and after the transaction ends. The isolation means that a database allows a plurality of concurrent transactions to read, write, and modify data at the same time. The isolation can prevent data inconsistency caused by cross execution of the plurality of concurrent transactions. The durability means that after a transaction is executed, a data modification is permanent and is not lost even if a system fault occurs.

A coordinator plays a coordinator role in an execution process of a transaction. In a distributed system, when a transaction is executed across a plurality of participants (that is, a transaction request included in the transaction is executed by a plurality of participants), that is, when the transaction is a distributed transaction, each participant can determine a result of executing the transaction request by the participant, but cannot learn of a result of executing the transaction request by another participant. For a purpose of maintaining the foregoing transaction features, the coordinator is introduced to manage results of executing the transaction request, and indicate the participant whether to commit the result of executing the transaction request, for example, replace original data with updated data.

A participant plays an executor role in an execution process of a transaction, and is configured to receive a transaction request sent by a coordinator, and perform a specified operation on data specified in the transaction request. One transaction includes a transaction request for one or more pieces of data, and the transaction request is a read request or a write request.

For ease of understanding, the following describes a transaction, a participant, and a coordinator by using a specific example of bank transfer. In this example, M yuan is transferred from a bank account X in a place A to a bank account Y in a place B. In this case, an operation of subtraction of M yuan (which may be referred to as an operation 1 for ease of description) needs to be performed on the account X, and an operation of addition of M yuan (which may be referred to as an operation 2 for ease of description) needs to be performed on the account Y. Bank account data of the place A and bank account data of the place B are usually stored on different nodes, and the two different nodes are participants involved in executing a transaction of the bank transfer. A node that sends a transaction request (a write request in this example) to the two nodes is a coordinator.

Due to atomicity, consistency, isolation, and durability features of the transaction, when the operation 1 is performed successfully but the operation 2 is not performed successfully, the participant corresponding to the operation 1 may roll back the operation 1, so that both the operation 1 and the operation 2 are performed successfully or fail to be performed. In other words, a series of operations included in a transaction can be safely and correctly performed in any case.

For example, a transaction processing system is a distributed system, and the distributed system includes one or more service nodes, one or more coordinator nodes, and a plurality of participant nodes. The service node is a node related to a service, the coordinator node is a node serving as a coordinator, and the participant node is a node serving as a participant. These nodes may be physical machines, or virtual machines, containers, or the like deployed on physical machines. The physical machine is a device having a data processing capability, for example, may be a terminal or a server. In FIG. 1, an example in which a distributed system includes one service node, one coordinator node, and a plurality of participant nodes is used. The coordinator node is configured to receive a transaction request sent by the service node, and send the transaction request to one or more participant nodes for execution.

In some implementations, the coordinator node may be independent. In other words, the coordinator node does not execute the transaction request, and coordinates only a participant node that executes the transaction. In some other implementations, the coordinator node may also serve as a participant node. In other words, the coordinator node may also execute the transaction request. In addition, a node may serve as a coordinator node in a process of processing a transaction, or may serve as a participant node in a process of processing another transaction. In other words, a node may be both a coordinator node and a participant node.

Each participant node stores at least one data partition. Each participant node is configured to process a plurality of transactions, and a combination of data partitions accessed by each transaction includes at least one data partition. Data partitions are a plurality of chunks obtained by splitting a data table. These chunks logically form a complete data table, but are a plurality of physical chunks at a bottom layer. The data partition does not cause generation of a new data table. Instead, data in the data table is distributed to different storage media, such as different hard disks, systems, and servers. In this way, data retrieval efficiency can be improved, and a frequent input/output (I/O) pressure value of a database can be reduced.

The data partition may be classified into a horizontal partition and a vertical partition based on different manners of partitioning a data table. The horizontal partition is obtained by partitioning a row of the data table, and all columns defined in the data table can be found in each data partition, so that a feature of the data table is maintained. For example, a data table including ten-year social security records may be divided into 10 different data partitions by year, and each data partition includes one year of social security records. The vertical partition is obtained by partitioning a column of the data table, so that a width of a single data table is reduced. For example, for a data table including a large text column and/or a binary large object (BLOB) column, these text columns and BLOB columns are less frequently accessed, and therefore, the text columns and the BLOB columns may be partitioned into another data partition, so that an access speed can be improved and data correlation is ensured.

In the example of FIG. 1, a participant node 1 includes at least data partitions P11, P12, and P13, a participant node 2 includes at least data partitions P21, P22, and P23, and a participant node 3 includes at least data partitions P31, P32, and P33. In FIG. 1, an example in which a data partition is a vertical partition is used for description. For example, when the data table is a salary record table of employees of a company, P11, P12, and P13 may be employee identifiers (IDs), years, and payment months, and P21, P22, and P23 may be basic salaries, performance bonuses, and deductions of five social insurances and one housing fund. P31, P32, and P33 are salaries payable, taxes, and net salaries.

Financial personnel usually need to update the salary record table during salaries payment. The service node sends a transaction. The coordinator node receives the transaction, and forwards one or more transaction requests included in the transaction to a participant node to which a data partition requested to be operated in each transaction request belongs. The participant node executes the transaction request. For example, the participant node 1 executes a write request to update a payment month, the participant node 2 executes a write request to update a performance bonus, and the participant node 3 executes a write request to update a salary payable, a tax, and a net salary.

Figure 2:
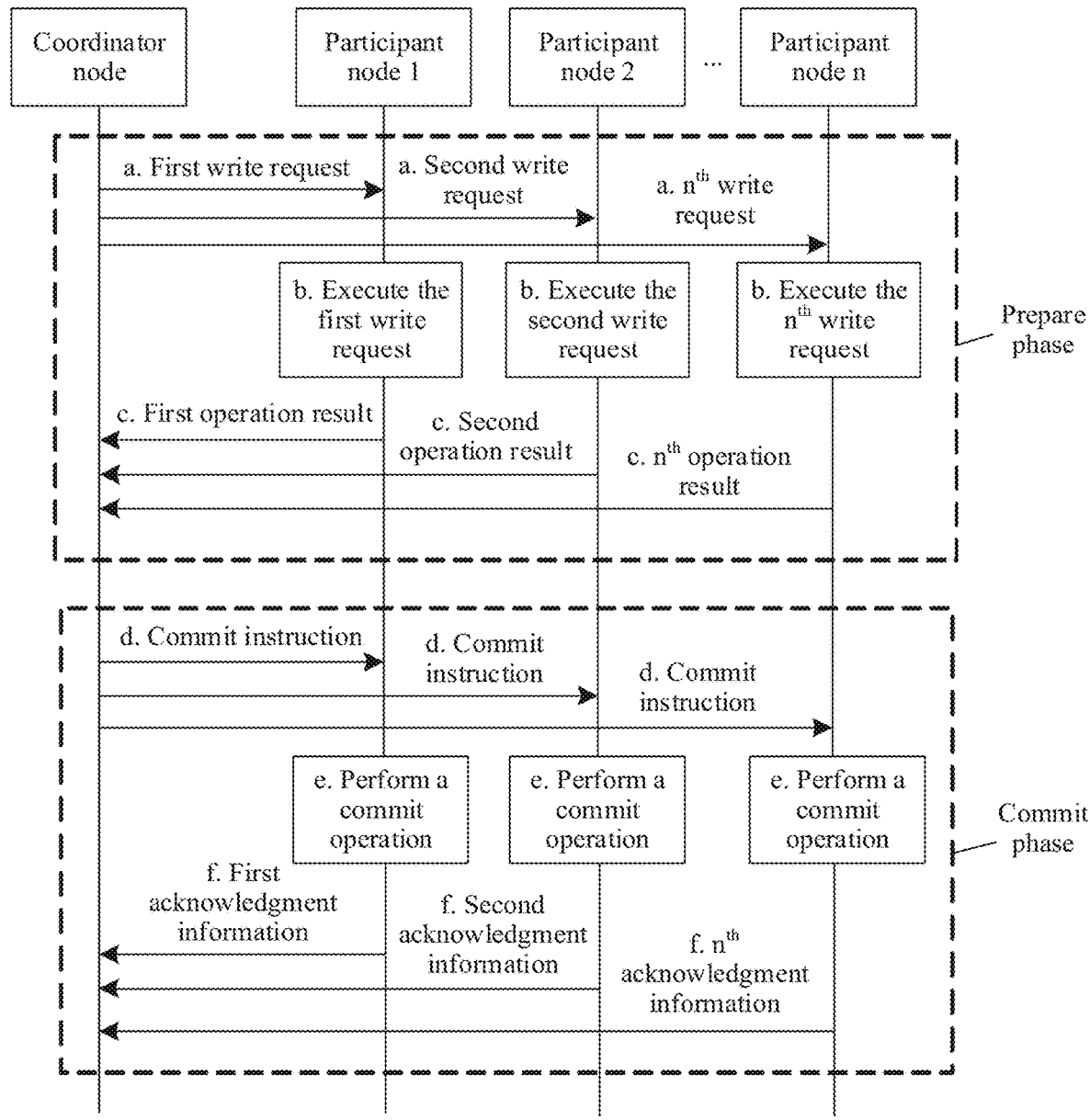
FIG. 2 is a flowchart of 2PC according to an embodiment of this disclosure.

Considering that data operated by the transaction related to a plurality of nodes at the same time, a commit protocol of a distributed transaction may be used to ensure atomicity, consistency, isolation, and durability of the transaction. A typical commit protocol of a distributed transaction is a 2PC protocol. 2PC includes a prepare phase and a commit phase. As shown in FIG. 2, an example in which a transaction request included in a transaction sent by a service node is a write request is used. The prepare phase includes:

a. After receiving a transaction sent by a service node, a coordinator node forwards one or more write requests included in the transaction to a participant node to which a data partition requested to be operated in each write request belongs. In FIG. 2, an example in which the participant node 1 receives a first write request, the participant node 2 receives a second write request, and a participant node n receives an $n^{th}$ write request is used.

b. After receiving the write request, each participant node executes the received write request. The participant node executes the write request on original data to obtain target data, but does not replace the original data with the target data, and only temporarily stores the target data.

c. The participant node sends an operation result to the coordinator node. If the participant node can successfully obtain the target data based on the original data requested to be operated in the write request in step b, the participant node sends an operation result of an operation success to the coordinator node. If the participant node cannot successfully obtain the target data based on the original data requested to be operated in the write request in step b, the participant node sends an operation result of an operation failure to the coordinator node. In FIG. 2, an example in which the participant node 1 generates a first operation result based on an execution status of the first write request, the participant node 2 generates a second operation result based on an execution status of the second write request, and the participant node Pn generates an $n^{th}$ operation result based on an execution status of the $n^{th}$ write request is used.

Figure 3:
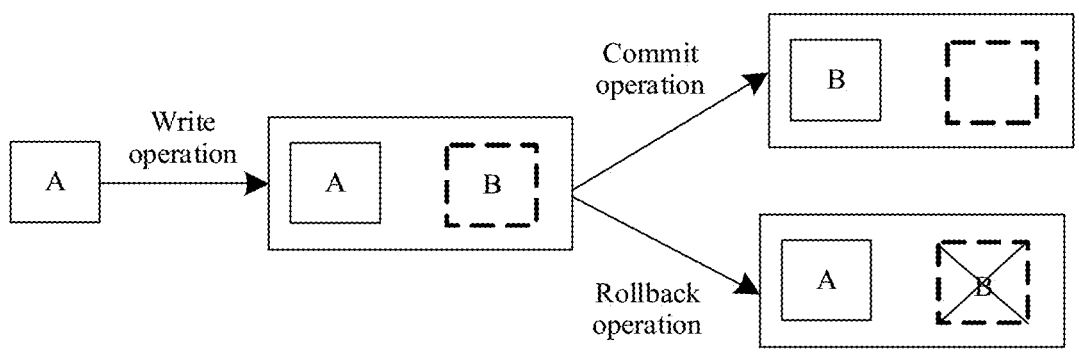
FIG. 3 is a schematic diagram of commit or rollback according to an embodiment of this disclosure.

The commit phase includes:

d. The coordinator node determines an execution result of the write request based on the operation result sent by each participant node, and sends a commit instruction or a rollback instruction to each participant node. In a case in which operation results of all participant nodes are operation successes, the coordinator node determines that the execution result of the write request is an execution success, and the coordinator node sends the commit instruction to each participant node. In a case in which at least one of operation results of all participant nodes is an operation failure, the coordinator node determines that the execution result of the write request is an execution failure, and the coordinator node sends the rollback instruction to each participant node. In FIG. 2, an example in which the execution result of the write request is the commit instruction is used.

e. Each participant node executes the received commit instruction or rollback instruction. When the coordinator node sends the commit instruction, each participant node performs a commit operation and replaces the original data with the target data. When the coordinator node sends the rollback instruction, each participant node performs a rollback operation and deletes the temporarily stored target data. As shown in FIG. 3, target data B is obtained after a write operation is performed on original data A. Before a commit instruction or a rollback instruction is received, the target data B is temporarily stored. If the participant node performs a commit operation according to the commit instruction, A is replaced with B. If the participant node performs a rollback operation according to the rollback instruction, the temporarily stored target data B is deleted.

f. Each participant node sends an acknowledgment message to the coordinator node, and the acknowledgment message indicates completion of the commit operation or completion of the rollback operation. In FIG. 2, an example in which the participant node 1 generates first acknowledgment information, the participant node 2 generates second acknowledgment information, and the participant node n generates $n^{th}$ acknowledgment information is used.

After receiving the acknowledgment message fed back by each participant node, the coordinator node returns an execution result of the transaction to the service node.

The foregoing describes an interaction process between the coordinator and the participant in the 2PC. It can be learned from the foregoing interaction process that a quantity of times of interaction between the coordinator node and the participant node is large, and the quantity of times of interaction is related to a quantity of participant nodes during transaction execution. A larger quantity of participant nodes during transaction execution indicates a larger quantity of times of interaction. Consequently, a transaction commit delay is long, and transaction commit performance deteriorates.

Therefore, an embodiment of this disclosure provides a management method for a transaction processing system. The method may be performed by a node in the transaction processing system, for example, a coordinator node. When the transaction processing system further includes a router node, the method may alternatively be performed by the router node. In some implementations, the method may alternatively be performed by a node outside the transaction processing system. For ease of description, in embodiments of this disclosure, a node that performs the management method for the transaction processing system is referred to as a management node. In some implementations, the method may alternatively be performed by a management cluster including at least one management node, so that availability can be improved.

The management node obtains a quantity of transactions accessing each combination of data partitions in a cycle, and adjusts storage of data partitions on a plurality of participant nodes based on the quantity of transactions accessing each combination of data partitions in the cycle, to reduce a quantity of participant nodes participating in the transaction. In this way, a quantity of times of interaction between the coordinator node and the participant node can be reduced, a transaction commit delay can be shortened, and transaction commit performance can be improved.

To make the technical solutions of this disclosure clearer and more comprehensible, the following describes, with reference to the accompanying drawings, the management method for the transaction processing system provided in embodiments of this disclosure.

Figure 4:
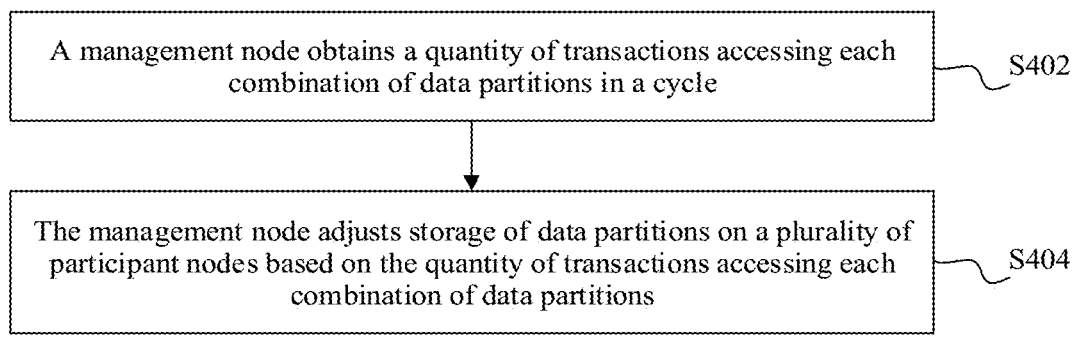
FIG. 4 is a flowchart of a management method for a transaction processing system according to an embodiment of this disclosure.

Refer to a flowchart of a management method for a transaction processing system shown in FIG. 4. The method includes the following steps.

S402: A management node obtains a quantity of transactions accessing each combination of data partitions in a cycle.

A transaction sent by a service node is delivered by a coordinator node to a related participant node for execution, and a distribution condition of data partitions on the participant node is known. Therefore, the coordinator node may determine a combination of data partitions accessed by the transaction delivered by the coordinator node. The combination of data partitions includes at least one data partition.

Based on this, each time delivering a transaction in a cycle, the coordinator node may perform an operation of adding 1 to a quantity of times of accessing the combination of data partitions accessed by the transaction, so as to obtain the quantity of transactions accessing each combination of data partitions in the cycle. Each combination of data partitions may be a combination of all data partitions in the transaction processing system, or may be a combination of some data partitions.

When the transaction processing system processes different transactions, coordinator nodes may be different. Based on this, the management node may separately obtain, from each coordinator node, a quantity of transactions accessing each combination of data partitions in the cycle, and then separately sum up the quantity of transactions obtained from each coordinator node according to the combination of data partitions, so as to obtain the quantity of transactions accessing each combination of data partitions in the cycle.

For example, the management node obtains, from a coordinator node 1, a quantity 3 of transactions accessing a combination of data partitions <P11, P21> in the cycle, a quantity 5 of transactions accessing a combination of data partitions <P21, P31> in the cycle, and obtains, from a coordinator node 2, a quantity 7 of transactions accessing the combination of data partitions <P11, P21> in the cycle, and a quantity 4 of transactions accessing a combination of data partitions <P11, P31> in the cycle. In this case, the management node separately sums up quantities of transactions according to the combinations of data partitions, and may obtain a quantity 3+7=10 of transactions accessing the combination of data partitions <P11, P21> in the cycle, a quantity 5+0=5 of transactions accessing the combination of data partitions <P21, P31>, and a quantity 4+0=4 of transactions accessing the combination of data partitions <P11, P31>.

When the transaction processing system creates a partition view for the data partition, the management node may obtain, through a view manager (ViewMgr), a quantity of transactions accessing each combination of data partitions in the cycle.

The partition view is a virtual data table including query statements. From an internal perspective of the transaction processing system, the partition view includes data in one or more data tables. From an external perspective of the transaction processing system, the partition view is like a data table. Common operations on a data table, such as query, insertion, modification, and deletion, can be performed on the partition view. The partition view hides a bottom-layer data table structure, simplifies data access operations, and provides another entry for viewing data. Because a user is not granted permission to access the bottom-layer data table, security is improved. The view manager is a tool for managing the partition view.

Figure 5:
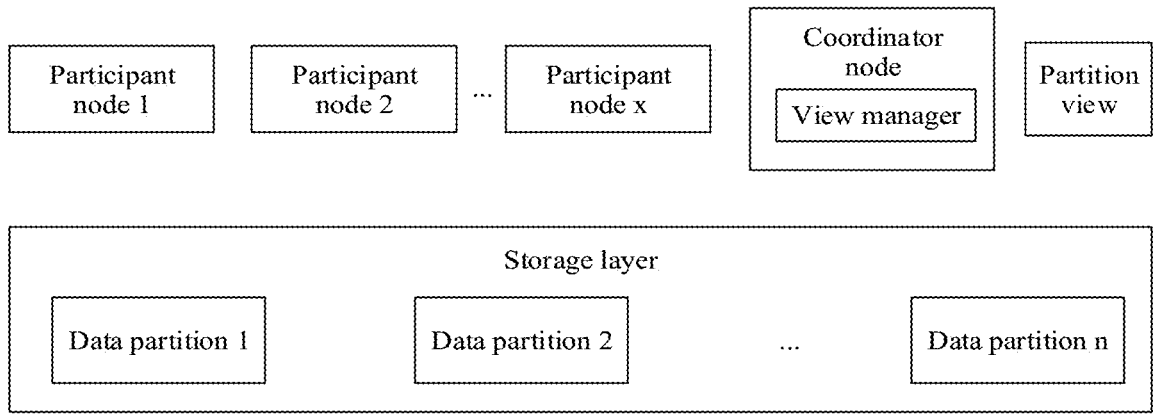
FIG. 5 is a schematic diagram of managing a data partition of a transaction processing system according to an embodiment of this disclosure.

In some implementations, the management node is a node in the transaction processing system. For example, as shown in FIG. 5, the management node may be a coordinator node in the transaction processing system. The view manager may be deployed in the coordinator node. In the example shown in FIG. 5, the transaction processing system uses an architecture in which computing and storage are separated. In this architecture, the service node only logically holds data, and the data is stored in a shared storage layer. The storage layer includes a plurality of data partitions, for example, data partitions 1 to n, and participant nodes 1 to x have a logical mapping relationship with the data partitions 1 to n. When receiving a transaction request, each participant node accesses a data partition having a logical mapping relationship with the participant node, to execute the transaction request. Because all general operations on a data table may be performed on a partition view, each participant node may execute the transaction request by performing operations such as query, insertion, modification, and deletion on the partition view. The coordinator node may record a quantity of transactions accessing a combination of data partitions based on the combination of data partitions requested to be operated during execution of the transaction.

The view manager may actively obtain, from each coordinator node, a quantity of transactions accessing each combination of data partitions in the cycle, or receive a quantity that is reported by each coordinator node and that is of transactions accessing at least one combination of data partitions in the cycle. Then, the view manager sums up, according to the combination of data partitions, the data obtained from each coordinator node, so as to obtain the quantity of transactions accessing each combination of data partitions in the cycle.

In some other implementations, the transaction processing system may further include a router node. For a read request in a transaction request, the router node directly sends the read request to a corresponding participant node. For a write request in a transaction request, the router node sends the write request to the coordinator node, and then the coordinator node sends the write request to a corresponding participant node, to implement read/write splitting.

Figure 6:
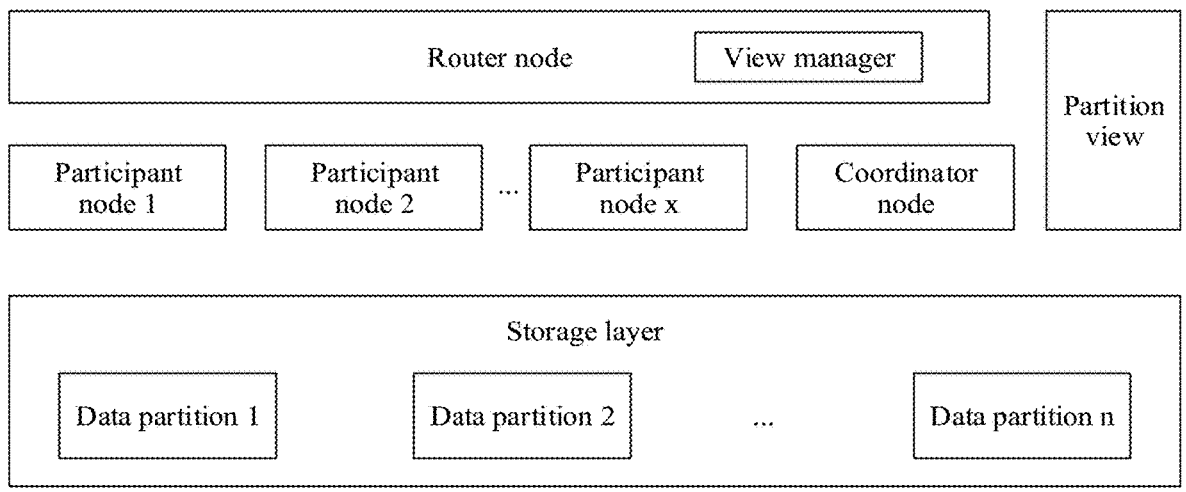
FIG. 6 is a schematic diagram of managing a data partition of a transaction processing system according to an embodiment of this disclosure.

As shown in FIG. 6, the management node may be a router node in the transaction processing system. The view manager may be deployed in the router node. The view manager obtains, from each coordinator node, a quantity of transactions accessing each combination of data partitions in the cycle, and then separately sums up the quantity of transactions according to the combination of data partitions.

Figure 7:
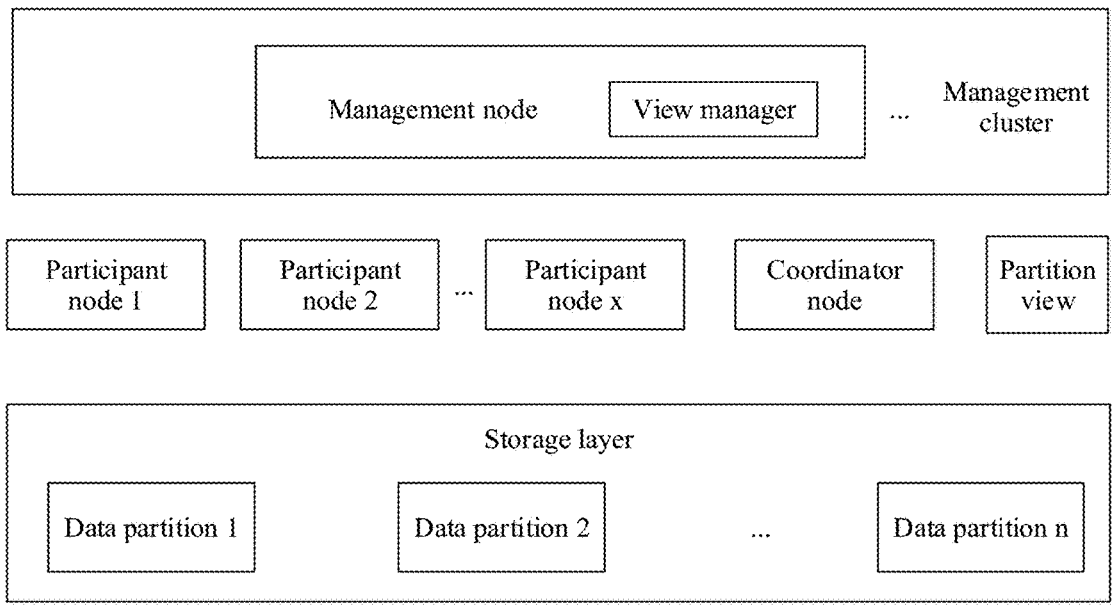
FIG. 7 is a schematic diagram of managing a data partition of a transaction processing system according to an embodiment of this disclosure.

In some other implementations, the management node may alternatively be a node outside the transaction processing system. The management node may be a node in a management cluster. As shown in FIG. 7, the view manager is deployed in a management node outside the transaction processing system. The view manager communicates with the coordinator node in the transaction processing system, obtains, from each coordinator node, a quantity of transactions accessing each combination of data partitions in the cycle, and then separately sums up the quantity of transactions according to the combination of data partitions.

The cycle may be set according to an actual service requirement. For example, the cycle can be set to 1 minute, 1 day, 1 week, or the like. A quantity that is obtained by the view manager and that is of transactions accessing a combination of data partitions may be indicated by {<partitions_related>, txnCnt}. <partitions_related> indicates the combination of data partitions accessed by the transaction, and txnCnt indicates the quantity of transactions accessing the combination of data partitions. For example, {<Px, Py, . . . >, xx} indicates that xx transactions access <Px, Py, . . . > in the cycle.

S404: The management node adjusts storage of data partitions on a plurality of participant nodes based on the quantity of transactions accessing each combination of data partitions in the cycle.

The quantity of transactions accessing each combination of data partitions may reflect affinity of the data partitions in the combination of data partitions. The affinity is an indicator for measuring affinity of a data partition. Higher affinity indicates higher possibility that the data partitions in the combination of data partitions are accessed at the same time. Lower affinity indicates lower possibility that the data partitions in the combination of data partitions are accessed at the same time. Based on this, the management node may adjust storage of the data partitions on the participant nodes based on the quantity of transactions accessing the combination of data partitions, to reduce a quantity of participant nodes participating in the transaction.

The management node determines a target combination of data partitions based on the quantity of transactions accessing the combination of data partitions in the cycle, and then migrates one or more data partitions in the target combination of data partitions from N participant nodes to M participant nodes, where N is greater than M.

The target combination of data partitions may be one or more of the accessed combinations of data partitions in the cycle. When a quantity of transactions accessing a combination of data partitions in the cycle reaches a preset quantity, the management node may determine the combination of data partitions as the target combination of data partitions. In some implementations, the management node may further determine a ratio of the quantity of transactions accessing the combination of data partitions in the cycle to a total quantity of transactions accessing each combination of data partitions, and when the ratio is greater than a preset ratio, determine the combination of data partitions as the target combination of data partitions.

The target combination of data partitions may alternatively be one or more of sub-combinations of the accessed combinations of data partitions in the cycle. When a quantity of transactions accessing a sub-combination in the cycle reaches a preset quantity, the management node may determine the sub-combination as the target combination of data partitions. In some implementations, the management node may further determine a ratio of the quantity of transactions accessing the sub-combination in the cycle to a total quantity of transactions accessing each combination of data partitions, and when the ratio is greater than a preset ratio, determine the combination of data partitions as the target combination of data partitions.

For ease of understanding, the following describes a process of determining the target combination of data partitions with reference to a specific example. For example, when a quantity of transactions accessing a combination of data partitions <P1, P2, P5> reaches 10, <P1, P2, P5> may be determined as the target combination of data partitions. For another example, a quantity of transactions accessing a combination of data partitions <P1, P2, P5> is 6, and a quantity of transactions accessing a combination of data partitions <P1, P2, P4> is 4. It can be learned that a quantity of transactions accessing a sub-combination <P1, P2> is 6+4=10, and <P1, P2> may be determined as the target combination of data partitions.

In some implementations, the management node may migrate the one or more data partitions in the target combination of data partitions from the N participant nodes to one participant node. In this way, a quantity of participant nodes participating in the transaction can be greatly reduced, so that a quantity of times of interaction between the coordinator node and the participant node is reduced. This shortens a transaction commit delay, and improves transaction commit performance.

Certainly, in consideration of a case in which performance deteriorates when a node is overloaded, the management node may further adjust storage of the data partition on the participant node based on the quantity of transactions accessing each combination of data partitions in the cycle, load of the participant node, and a load balance policy. The management node may obtain load of each participant node, and then migrate each data partition in the target combination of data partitions from the N participant nodes to M light-load participant nodes. To reduce overheads generated by the migration operation, the management node may migrate each data partition in the target combination of data partitions from the N participant nodes to M light-load participant nodes among the N nodes.

For ease of understanding, the following provides description with reference to a specific example.

Figure 8:
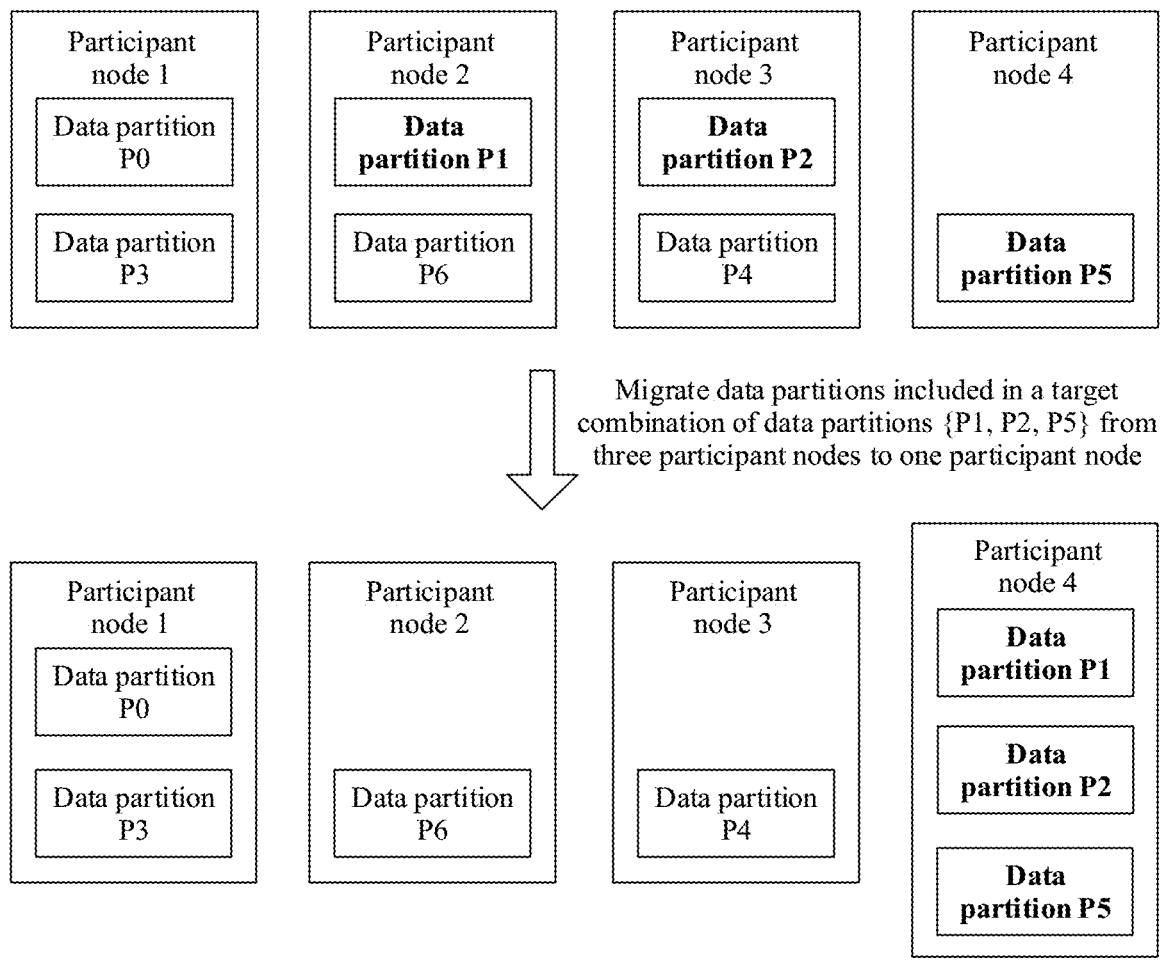
FIG. 8 is a schematic diagram of partition migrating according to an embodiment of this disclosure.

As shown in FIG. 8, a current data partition distribution condition is: the participant node 1 stores data partitions P0 and P3, the participant node 2 stores data partitions P1 and P6, a participant node 3 stores data partitions P2 and P4, and a participant node 4 stores a data partition P5. The management node determines a target combination of data partitions {P1, P2, P5} based on the quantity of transactions accessing each combination of data partitions. Then, considering that load of the participant node 4 is light, the management node migrates the data partition P1 from the participant node 2 to the participant node 4, and migrates the data partition P2 from the participant node 3 to the participant node 4. In this way, the data partitions P1, P2, and P5 are located on the same participant node, that is, the participant node 4. When the transaction processing system processes a transaction, the coordinator node interacts with only the participant node 4, so that a quantity of times of interaction between the coordinator node and the participant node is reduced. This shortens a transaction commit delay, and improves transaction commit performance.

Further, when the transaction processing system uses the architecture in which computing and storage are separated, because the participant node and the data partition are in a logical mapping relationship, the management node may modify the logical mapping relationship, so as to implement migration of the data partition between the participant nodes. In this way, migration costs are reduced.

In the embodiment shown in FIG. 4, the management node may collect, in the cycle, the quantity of transactions accessing each combination of data partitions, to adjust storage of the data partitions on the participant node based on the quantity of transactions that are collected in real time and that access each combination of data partitions, so that the data partitions participating in the transaction together can be on a same node. This reduces the quantity of participant nodes during execution of the transaction, reduces the quantity of times of interaction in 2PC, and improves transaction commit efficiency.

Considering that data accessed by some services has a specific rule, the management node may further predict, by using the specific rule, the quantity of transactions accessing each combination of data partitions in the cycle. The data accessed by some services has a trend of seasonality. The seasonality refers to a pattern of repetition in a fixed time period, and may be represented as presenting a same change direction and an approximately same change amplitude in a same time period. The trend refers to a basic trend of an indicator. For example, when a website has a larger quantity of visits on weekends, visit data is displayed in a trend of seasonality with seven days as a cycle. For another example, an employee of a company always punches in from 8:00 a.m. to 9:00 a.m., and punches out from 5:00 p.m. to 6:00 p.m., so that a card punching time point presents a trend of seasonality with one day as a cycle.

Based on this, the management node may obtain a quantity of transactions accessing each combination of data partitions in a history cycle, and then predict, based on the quantity of transactions accessing each combination of data partitions in the history cycle, the quantity of transactions accessing each combination of data partitions in the cycle. For example, the management node may obtain a card punching time point of yesterday, and predict a card punching time point of today based on the card punching time point of yesterday. In this way, the management node may migrate the one or more data partitions in advance based on a prediction result, to reduce a quantity of participant nodes during execution of the transaction. This improves transaction commit efficiency, and improves a throughput.

In some implementations, the management node may predict, based on at least one model, the quantity of transactions accessing each combination of data partitions in the cycle. According to different service scenarios, the management node may use different models to predict the quantity of transactions accessing each combination of data partitions in the cycle.

For example, for service scenarios such as a service scenario of sales revenue prediction, a service scenario of traffic flow prediction, and a service scenario of hospital patient quantity prediction, the management node may predict, based on an ARIMA and the quantity of transactions accessing each combination of data partitions in the history cycle, the quantity of transactions accessing each combination of data partitions in the cycle.

For another example, for service scenarios such as a service scenario of stock fluctuation prediction and a service scenario of factory production prediction, the management node may predict, based on an exponential smoothing model and the quantity of transactions accessing each combination of data partitions in the history cycle, the quantity of transactions accessing each combination of data partitions in the cycle. Certainly, for the service scenario of sales revenue prediction, the management node may also perform prediction based on the exponential smoothing model. When performing prediction based on the exponential smoothing model, the management node may draw a corresponding curve according to the quantity of transactions accessing each combination of data partitions in the history cycle, and then predict, based on the exponential smoothing model such as a first exponential smoothing prediction method or a second exponential smoothing prediction method, the quantity of transactions accessing each combination of data partitions in the cycle.

For service scenarios such as the service scenario of sales revenue prediction and a service scenario of intermittent prediction for product sales, the management node may further predict, based on an NPTS model and the quantity of transactions accessing each combination of data partitions in the history cycle, the quantity of transactions accessing each combination of data partitions in the cycle. It should be noted that, the management node may further predict, based on an NPTS-related variant model, the quantity of transactions accessing each combination of data partitions in the cycle.

For service scenarios such as a service scenario of climate prediction, a service scenario of holiday traffic prediction, and a service scenario of transaction data prediction, the management node may further predict, based on a prophet model and the quantity of transactions accessing each combination of data partitions in the history cycle, the quantity of transactions accessing each combination of data partitions in the cycle.

For climate prediction, store visit count prediction, commodity promotion prediction, and sales revenue prediction, the management node may further predict, based on a deep learning-based time series model (deep AR) and the quantity of transactions accessing each combination of data partitions in the history cycle, the quantity of transactions accessing each combination of data partitions in the cycle.

Figure 9:
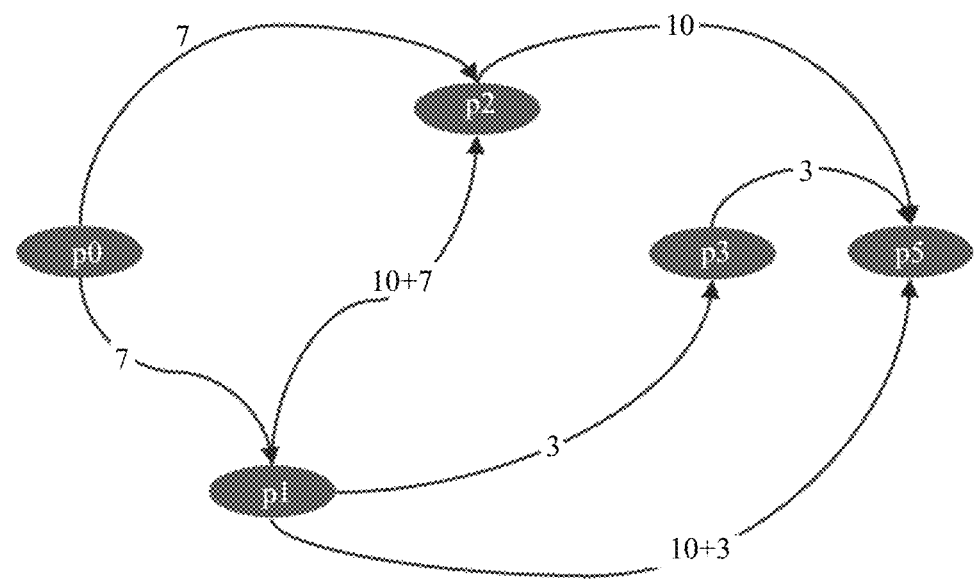
FIG. 9 is a schematic diagram of a transactional partition graph according to an embodiment of this disclosure.

After obtaining the quantity of transactions accessing each combination of data partitions in the cycle, the management node may use each partition as a vertex of a transactional partition graph. When two partitions appear in partitions_related fields at the same time, an edge is added to the two partitions, and a weight of the edge is txnCnt. For an existing edge, accumulation is performed on an existing weight, so as to generate the transactional partition graph. FIG. 9 shows an example of a transactional partition graph.

Then, the management node traverses the transactional partition graph, and selects an edge whose weight exceeds a preset threshold (the preset quantity or the preset ratio). For example, if the weight/total quantity of transactions ≥P, the edge is selected, affinity of two nodes (that is, two partitions) on the edge meets a requirement, and the management node migrates the two partitions on the edge to a same node.

As shown in the preceding figure, assuming that the preset threshold is 50%, and the transaction processing system executes 20 transactions in the statistical cycle. p1 and p2 participate in 17 transactions, p1 and p5 participate in 13 transactions, and p2 and p5 participate in 10 transactions. According to the preceding logic, partitions p1, p2, and p5 need to be migrated to a same node. Based on load of each participant node and the like, the management node may decide to migrate p1, p2, and p5 to a specific node.

The foregoing describes in detail the management method for the transaction processing system provided in this disclosure with reference to FIG. 1 to FIG. 9. The following describes an apparatus and a device provided in this disclosure with reference to the accompanying drawings.

Figure 10:
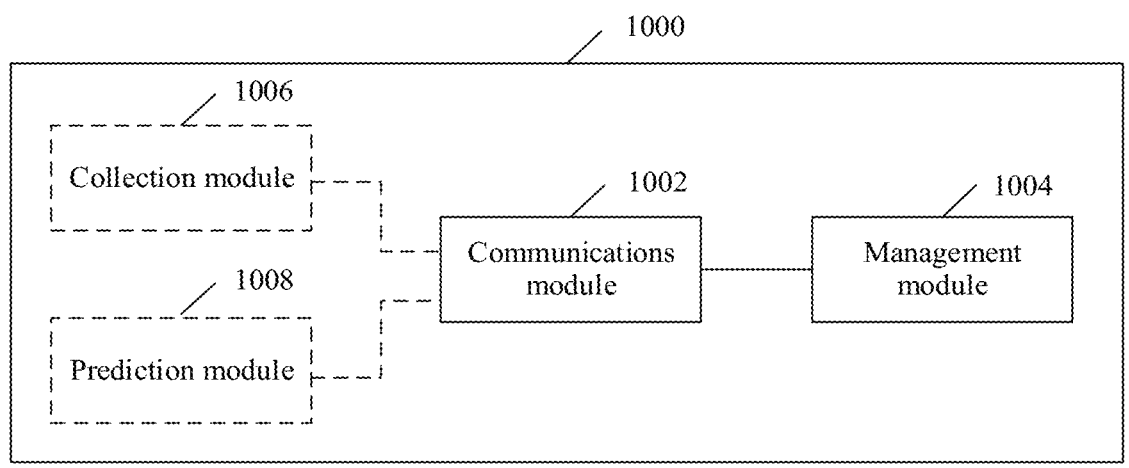
FIG. 10 is a schematic diagram of a structure of a management apparatus for a transaction processing system according to an embodiment of this disclosure.

Refer to a schematic diagram of a structure of a management apparatus for a transaction processing system shown in FIG. 10. The transaction processing system includes a plurality of participant nodes, each participant node stores a data partition, each participant node is configured to process a plurality of transactions, and a data partition combination accessed by each transaction includes at least one data partition. The apparatus 1000 includes: a communications module 1002, configured to obtain a quantity of transactions accessing each combination of data partitions in a cycle; and a management module 1004, configured to adjust storage of the data partitions on the plurality of participant nodes based on the quantity of transactions accessing each combination of data partitions in the cycle.

In some implementations, the apparatus 1000 further includes: a collection module 1006, configured to collect, in the cycle, the quantity of transactions accessing each combination of data partitions.

In some implementations, the communications module 1002 is configured to: obtain a quantity of transactions accessing each combination of data partitions in a history cycle.

The apparatus 1000 further includes: a prediction module 1008, configured to predict, based on the quantity of transactions accessing each combination of data partitions in the history cycle, the quantity of transactions accessing each combination of data partitions in the cycle.

In some implementations, the management module 1004 is configured to: determine a target combination of data partitions based on the quantity of transactions accessing each combination of data partitions in the cycle; and migrate one or more data partitions in the target combination of data partitions from N participant nodes to M participant nodes, where N is greater than M.

In some implementations, the management module 1004 is configured to: adjust storage of the data partitions on the plurality of participant nodes based on the quantity of transactions accessing each combination of data partitions in the cycle and load of the participant nodes.

The management apparatus 1000 for the transaction processing system according to this embodiment of this disclosure may correspondingly perform the method described in embodiments of this disclosure, and the foregoing and other operations and/or functions of the modules of the management apparatus 1000 for the transaction processing system are intended to implement a corresponding procedure of each method in FIG. 4. For brevity, details are not described herein again.

The management apparatus 1000 for the transaction processing system may be deployed in a coordinator node, a router node, or a node outside the transaction processing system. The foregoing node for implementing the management apparatus 1000 for the transaction processing system is also referred to as a management node. The management node may be a physical device, or may be a virtual machine, a container, or the like on a physical device.

Figure 11:
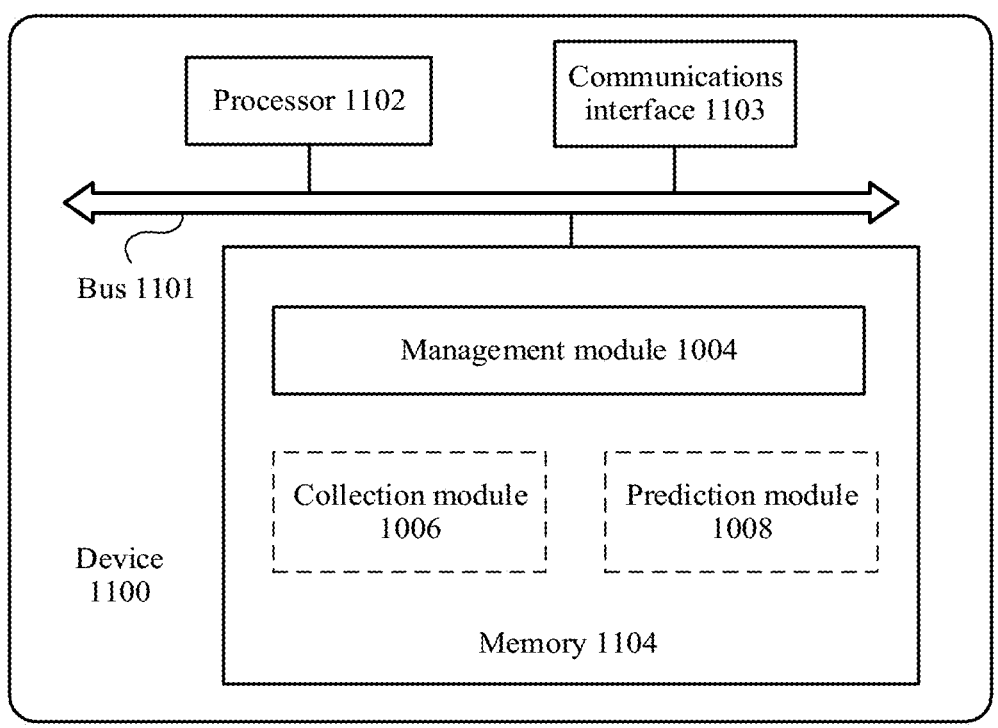
FIG. 11 is a schematic diagram of a structure of a device according to an embodiment of this disclosure.

An embodiment of this disclosure further provides a physical device (which is briefly referred to as a device below). FIG. 11 provides a schematic diagram of a structure of a device. As shown in FIG. 11, the device is configured to implement a function of the foregoing management apparatus 1000 for the transaction processing system. A device 1100 includes a bus 1101, a processor 1102, a communications interface 1103, and a memory 1104. The processor 1102, the memory 1104, and the communications interface 1103 communicate with each other by using the bus 1101. The bus 1101 may be a Peripheral Component Interconnect (PCI) bus, an Extended Industry Standard Architecture (EISA) bus, and or the like. The bus may be classified into an address bus, a data bus, a control bus, and the like. For ease of representation, only one bold line is used to represent the bus in FIG. 11, but this does not mean that there is only one bus or only one type of bus. The communications interface 1103 is configured to communicate with the outside, for example, obtain a quantity of transactions accessing each combination of data partitions in a cycle.

The processor 1102 may be a central processing unit (CPU). The memory 1104 may include a volatile memory, for example, a random-access memory (RAM). The memory 1104 may further include a non-volatile memory, for example, a read-only memory (ROM), a flash memory, a hard disk drive (HDD), or a solid-state drive (SSD).

The memory 1104 stores executable code, and the processor 1102 executes the executable code to perform the foregoing management method for the transaction processing system.

In a case in which the embodiment shown in FIG. 10 is implemented, and the modules of the management apparatus 1000 of the transaction processing system described in the embodiment of FIG. 10 are implemented by using software, software or program code required for performing functions of the management module 1004, the collection module 1006, and the prediction module 1008 in FIG. 10 is stored in the memory 1104. A function of the communications module 1002 may be implemented by using the communications interface 1103.

The processor 1102 may execute program code corresponding to the collection module 1006, to collect, in a cycle, a quantity of transactions accessing each combination of data partitions. The communications interface 1103 obtains the quantity of transactions accessing each combination of data partitions in the cycle, and transmits the obtained quantity to the processor 1102 by using the bus 1101. The processor 1102 executes program code corresponding to the management module 1004, to adjust storage of the data partitions on the plurality of participant nodes based on the quantity of transactions accessing each combination of data partitions in the cycle.

In some implementations, the communications interface 1103 may also obtain a quantity of transactions accessing each combination of data partitions in a history cycle, and transmit the quantity to the processor 1102 by using the bus 1101. The processor 1102 executes program code corresponding to the prediction module 1008, to predict, based on the quantity of transactions accessing each combination of data partitions in the history cycle, the quantity of transactions accessing each combination of data partitions in the cycle. The processor 1102 executes program code corresponding to the management module 1004, to adjust storage of the data partitions on the plurality of participant nodes in advance based on the predicted quantity of transactions accessing each combination of data partitions in the cycle.

An embodiment of this disclosure further provides a computer-readable storage medium. The computer-readable storage medium includes instructions. When the instructions are run on a computer, the computer is enabled to perform the foregoing management method for the transaction processing system that is applied to the management apparatus 1000 for the transaction processing system.

An embodiment of this disclosure further provides a computer program product. When the computer program product is executed by a computer, the computer performs any one of the foregoing management methods for the transaction processing system. The computer program product may be a software installation package. If any one of the foregoing management methods for the transaction processing system needs to be used, the computer program product may be downloaded, and the computer program product may be executed on the computer.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions in embodiments. In addition, in the accompanying drawings of the apparatus embodiments provided by this disclosure, connection relationships between modules indicate that the modules have communication connections with each other, which may be implemented as one or more communications buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. In addition, a specific hardware structure used to achieve a same function may be of various forms, for example, in a form of an analog circuit, a digital circuit, or a dedicated circuit. However, for this disclosure, a software program implementation is a better implementation in most cases. Based on such an understanding, the technical solutions of this disclosure essentially or the part contributing to the other technologies may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this disclosure.

All or some of the foregoing embodiments may be implemented by using software, hardware, firmware, or any combination thereof. When software is used to implement embodiments, all or some of the embodiments may be implemented in a form of a computer program product.

The computer program product includes one or more computer instructions. When the computer program instructions are loaded and executed on the computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD, or the like.

What is claimed is:

1. A method, comprising:
   obtaining a first quantity of transactions accessing each combination of data partitions in a cycle by:
      obtaining a second quantity of transactions accessing each combination of data partitions in a history cycle; and
      predicting, based on the second quantity, the first quantity; and
   adjusting, based on the first quantity, storage of the data partitions on a plurality of participant nodes.

2. The method of claim 1, wherein obtaining the first quantity further comprises collecting, in the cycle, the first quantity.

3. The method of claim 1, wherein adjusting the storage comprises:
   identifying, based on the first quantity, a target combination of data partitions; and
   migrating one or more data partitions in the target combination from N participant nodes to M participant nodes, and
   wherein N is greater than M.

4. The method of claim 1, wherein adjusting the storage comprises adjusting, based on the first quantity and a load of the participant nodes, the storage.

5. The method of claim 1, wherein the first quantity of transactions accessing each combination of data partitions indicates an affinity of the data partitions in the combination of data partitions.

6. A device, comprising:
   a memory configured to store instructions; and
   a processor coupled to the memory and configured to execute the instructions to:

obtain a first quantity of transactions accessing each combination of data partitions in a cycle by:
  obtaining a second quantity of transactions accessing each combination of data partitions in a history cycle; and
  predicting, based on the second quantity, the first quantity; and
adjust, based on the first quantity, storage of the data partitions on a plurality of participant nodes.

7. The device of claim 6, wherein the processor is further configured to obtain the first quantity by collecting, in the cycle, the first quantity.

8. The device of claim 6, wherein the processor is further configured to execute the instructions to:
  identify, based on the first quantity, a target combination of data partitions; and
  migrate one or more data partitions in the target combination from N participant nodes to M participant nodes, and
  wherein N is greater than M.

9. The device of claim 6, wherein the processor is further configured to execute the instructions to adjust, based on the first quantity and a load of the participant nodes, the storage.

10. The device of claim 6, wherein the first quantity of transactions accessing each combination of data partitions indicates an affinity of the data partitions in the combination of data partitions.

11. A computer program product comprising instructions stored on a non-transitory computer-readable medium that, when executed by a processor, cause a device to:
  obtain a first quantity of transactions accessing each combination of data partitions in a cycle by:
    obtaining a second quantity of transactions accessing each combination of data partitions in a history cycle; and
    predicting, based on the second quantity, the first quantity; and
  adjust, based on the first quantity, storage of the data partitions on a plurality of participant nodes.

12. The computer program product of claim 11, wherein the instructions further cause the device to obtain the first quantity by collecting, in the cycle, the first quantity.

13. The computer program product of claim 11, wherein the instructions further cause the device to:
  identify, based on the first quantity, a target combination of data partitions; and
  migrate one or more data partitions in the target combination from N participant nodes to M participant nodes, and
  wherein N is greater than M.

14. The computer program product of claim 11, wherein the instructions further cause the device to adjust, based on the first quantity and a load of the participant nodes, the storage.

15. The computer program product of claim 11, wherein the instructions further cause the device to reduce a quantity of the participant nodes participating in one of the transactions.

16. The computer program product of claim 11, wherein the instructions further cause the device to adjust, based on the first quantity, a load of the participant nodes, and a load balance policy, the storage.

17. The computer program product of claim 11, wherein the instructions further cause the device to adjust, based on the first quantity and a load balance policy, the storage.

18. The computer program product of claim 11, wherein the instructions further cause the device to migrate the data partitions to a same node.

19. The computer program product of claim 11, wherein the instructions further cause the device to migrate the data partitions according to a pattern of repetition in a fixed time period.

20. The computer program product of claim 11, wherein the first quantity of transactions accessing each combination of data partitions indicates an affinity of the data partitions in the combination of data partitions.

* * * * *